US007660318B2

(12) United States Patent
Rahman et al.

(10) Patent No.: US 7,660,318 B2
(45) Date of Patent: Feb. 9, 2010

(54) INTERNETWORKING SUPPORT BETWEEN A LAN AND A WIRELESS MESH NETWORK

(75) Inventors: Shahriar Rahman, Morgan Hill, CA (US); Johannes Petrus Kruys, Tiendhof Harmelen (NL); Robert Bernard O'Hara, Jr., Santa Clara, CA (US); Robert Charles Meier, Cuyahoga, OH (US)

(73) Assignee: Cisco Technology, Inc., San Jose, CA (US)

( * ) Notice: Subject to any disclaimer, the term of this patent is extended or adjusted under 35 U.S.C. 154(b) by 442 days.

(21) Appl. No.: 11/518,332

(22) Filed: Sep. 7, 2006

(65) Prior Publication Data

US 2007/0076730 A1 Apr. 5, 2007

Related U.S. Application Data

(60) Provisional application No. 60/719,046, filed on Sep. 20, 2005.

(51) Int. Cl.
*H04L 12/28* (2006.01)
*H04L 12/66* (2006.01)

(52) U.S. Cl. ...................................... 370/401; 370/463
(58) Field of Classification Search ........................ None
See application file for complete search history.

(56) References Cited

U.S. PATENT DOCUMENTS

| 4,365,331 A | 12/1982 | Biba et al. |
| 4,939,728 A | 7/1990 | Markkula, Jr. et al. |
| 5,136,580 A | 8/1992 | Videlock et al. |
| 5,138,615 A | 8/1992 | Lamport et al. |
| 5,150,464 A | 9/1992 | Sidhu et al. |
| 5,224,099 A | 6/1993 | Corbalis et al. |
| 5,251,205 A | 10/1993 | Callon et al. |
| 5,274,631 A | 12/1993 | Bhardwaj |
| 5,282,270 A | 1/1994 | Oppenheimer et al. |
| 5,295,154 A | 3/1994 | Meier et al. |
| 5,309,433 A | 5/1994 | Cidon et al. |
| 5,345,446 A | 9/1994 | Hiller et al. |

(Continued)

FOREIGN PATENT DOCUMENTS

EP 0567217 10/1993

(Continued)

OTHER PUBLICATIONS

Cisco Systems, Inc., "Configuration and Management", printed from http://www/cisco.com/univercd/cc/td/doc/product/ lan/28201900/ 1928v67x/ 19icg67x/19icoutb.htm, on May 27, 1999, 62 pages.

(Continued)

*Primary Examiner*—Gregory B Sefcheck
(74) *Attorney, Agent, or Firm*—Tucker Ellis & West LLP (57) ABSTRACT

In one embodiment, two portals lie between a wireless mesh network and a LAN. Each portal provides a communication path between the mesh network and the LAN. The second portal is configured to forward data frames with unknown destinations to the first portal across an intramesh path between the two portals.

20 Claims, 7 Drawing Sheets

Expanded Network 400

U.S. PATENT DOCUMENTS

| | | | |
|---|---|---|---|
| 5,361,256 | A | 11/1994 | Doeringer et al. |
| 5,365,524 | A | 11/1994 | Hiller et al. |
| 5,367,635 | A | 11/1994 | Bauer et al. |
| 5,383,179 | A | 1/1995 | Saini et al. |
| 5,388,213 | A | 2/1995 | Oppenheimer et al. |
| 5,394,436 | A | 2/1995 | Meier et al. |
| 5,428,636 | A | 6/1995 | Meier |
| 5,473,599 | A | 12/1995 | Li et al. |
| 5,473,607 | A | 12/1995 | Hausman et al. |
| 5,502,725 | A | 3/1996 | Pohjakallio |
| 5,504,746 | A | 4/1996 | Meier |
| 5,515,376 | A | 5/1996 | Murthy et al. |
| 5,561,669 | A | 10/1996 | Lenney et al. |
| 5,570,360 | A | 10/1996 | Klausmeier et al. |
| 5,583,862 | A | 12/1996 | Callon |
| 5,610,905 | A | 3/1997 | Murthy et al. |
| 5,673,031 | A | 9/1997 | Meier |
| 5,678,006 | A | 10/1997 | Valizadeh et al. |
| 5,712,981 | A | 1/1998 | McKee et al. |
| 5,734,654 | A | 3/1998 | Shirai et al. |
| 5,740,171 | A | 4/1998 | Mazzola et al. |
| 5,748,619 | A | 5/1998 | Meier |
| 5,751,710 | A | 5/1998 | Crowther et al. |
| 5,790,536 | A | 8/1998 | Mahany et al. |
| 5,796,732 | A | 8/1998 | Mazzola et al. |
| 5,802,042 | A | 9/1998 | Natarajan et al. |
| 5,802,047 | A | 9/1998 | Kinoshita |
| 5,802,054 | A | 9/1998 | Bellenger |
| 5,835,720 | A | 11/1998 | Nelson et al. |
| 5,848,242 | A | 12/1998 | Behaghel et al. |
| 5,854,901 | A | 12/1998 | Cole et al. |
| 5,867,666 | A | 2/1999 | Harvey |
| 5,870,386 | A * | 2/1999 | Perlman et al. ............. 370/256 |
| 5,872,783 | A | 2/1999 | Chin |
| 5,918,016 | A | 6/1999 | Brewer et al. |
| 5,926,101 | A | 7/1999 | Dasgupta |
| 5,949,786 | A | 9/1999 | Bellenger |
| 5,959,990 | A | 9/1999 | Frantz et al. |
| 5,964,841 | A | 10/1999 | Rekhter |
| 5,991,810 | A | 11/1999 | Shapiro et al. |
| 6,018,770 | A | 1/2000 | Little et al. |
| 6,047,376 | A | 4/2000 | Hosoe |
| 6,055,236 | A | 4/2000 | Nessett et al. |
| 6,055,561 | A | 4/2000 | Feldman et al. |
| 6,092,196 | A | 7/2000 | Reiche |
| 6,111,858 | A | 8/2000 | Greaves et al. |
| 6,256,306 | B1 | 7/2001 | Bellenger |
| 6,377,987 | B1 | 4/2002 | Kracht |
| 6,389,024 | B1 | 5/2002 | Ghai et al. |
| 6,407,991 | B1 | 6/2002 | Meier |
| 6,445,710 | B1 * | 9/2002 | Perlman et al. ............. 370/401 |
| 6,452,910 | B1 * | 9/2002 | Vij et al. ..................... 370/310 |
| 6,456,597 | B1 | 9/2002 | Bare |
| 6,459,700 | B1 * | 10/2002 | Hoang ........................ 370/401 |
| 6,480,508 | B1 * | 11/2002 | Mwikalo et al. ............ 370/475 |
| 6,545,982 | B1 | 4/2003 | Murthy et al. |
| 6,549,786 | B2 * | 4/2003 | Cheung et al. .............. 455/524 |
| 6,570,875 | B1 | 5/2003 | Hegde |
| 6,628,620 | B1 | 9/2003 | Cain |
| 6,701,361 | B1 * | 3/2004 | Meier ......................... 709/224 |
| 6,744,771 | B1 * | 6/2004 | Barber et al. ................ 370/400 |
| 6,772,219 | B1 | 8/2004 | Shobatake |
| 6,917,985 | B2 | 7/2005 | Madruga et al. |
| 6,952,421 | B1 | 10/2005 | Slater |
| 7,145,916 | B2 * | 12/2006 | McNeil et al. .............. 370/458 |
| 7,173,934 | B2 * | 2/2007 | Lapuh et al. ................ 370/392 |
| 2002/0013856 | A1 | 1/2002 | Garcia-Luna-Aceves et al. |
| 2002/0049561 | A1 | 4/2002 | Garcia-Luna-Aceves et al. |
| 2002/0069278 | A1 | 6/2002 | Forslow |
| 2002/0196792 | A1 * | 12/2002 | McNeil et al. .............. 370/401 |
| 2003/0020992 | A1 | 1/2003 | Child |
| 2003/0037167 | A1 | 2/2003 | Garcia-Luna-Aceves et al. |
| 2003/0058804 | A1 | 3/2003 | Saleh et al. |
| 2003/0112810 | A1 | 6/2003 | Nakabayashi et al. |
| 2004/0131042 | A1 | 7/2004 | Lillie et al. |
| 2004/0156321 | A1 | 8/2004 | Walker et al. |
| 2004/0184450 | A1 | 9/2004 | Omran |
| 2004/0205245 | A1 * | 10/2004 | Le Pennec et al. .......... 709/245 |
| 2005/0036486 | A1 | 2/2005 | Sahinoglu et al. |
| 2005/0088997 | A1 * | 4/2005 | Melpignano ................ 370/338 |
| 2005/0105524 | A1 | 5/2005 | Stevens et al. |
| 2005/0136972 | A1 | 6/2005 | Smith et al. |
| 2005/0157661 | A1 | 7/2005 | Cho |
| 2005/0213547 | A1 * | 9/2005 | Meier ......................... 370/338 |
| 2005/0220054 | A1 | 10/2005 | Meier et al. |
| 2005/0223111 | A1 * | 10/2005 | Bhandaru et al. ........... 709/236 |
| 2006/0013225 | A1 * | 1/2006 | Haywood et al. ........... 370/389 |
| 2006/0056457 | A1 * | 3/2006 | Livet et al. .................. 370/475 |
| 2006/0146846 | A1 | 7/2006 | Yarvis et al. |
| 2006/0265480 | A1 * | 11/2006 | Kim et al. ................... 709/220 |
| 2006/0268749 | A1 * | 11/2006 | Rahman et al. ............. 370/256 |
| 2006/0280152 | A1 * | 12/2006 | Lee et al. .................... 370/338 |
| 2007/0060141 | A1 * | 3/2007 | Kangude et al. ............ 455/445 |
| 2007/0110024 | A1 * | 5/2007 | Meier ......................... 370/351 |
| 2007/0121529 | A1 | 5/2007 | Meier |
| 2008/0025277 | A1 * | 1/2008 | Takatori et al. ............. 370/338 |
| 2008/0101578 | A1 * | 5/2008 | Barros et al. ........... 379/211.02 |
| 2008/0159358 | A1 * | 7/2008 | Ruiz et al. .................. 375/211 |

FOREIGN PATENT DOCUMENTS

JP        07099490        4/1995

OTHER PUBLICATIONS

PCT International Search Report, International Application No. PCT/US06/60828, Oct. 16, 2007.

* cited by examiner

Network 300

Figure 3

Expanded Network 400

Figure 4

| 510 | Portals forward unicast frames with unknown destinations to root. |
|---|---|
| 520 | Root forwards frames received from disconnected portals to external network. |
| 530 | Root forwards frames received from backup-to-root portals to disconnected portals. |
| 540 | Root forwards frames received from external network to disconnected portals. |

Forwarding Rules

Figure 5

Flowchart 600

Figure 6

Flowchart 700

Figure 7

INTERNETWORKING SUPPORT BETWEEN A LAN AND A WIRELESS MESH NETWORK

RELATED APPLICATIONS

This Application claims the benefit under 35 U.S.C. § 119(e) of U.S. Provisional Patent Application Ser. No. 60/719,046 by Rahman et al., filed on Sep. 20, 2005, entitled "EFFICIENT INTERNETWORKING SUPPORT IN WIRELESS MESH NETWORKS," assigned to the assignee of the present invention, and hereby incorporated by reference in its entirety.

This Application is related to U.S. Utility patent application Ser. No. 11/364,020 by Rahman et al., filed on Feb. 27, 2006, entitled "A HYBRID DISTANCE VECTOR PROTOCOL FOR WIRELESS MESH NETWORKS," assigned to the assignee of the present invention, and hereby incorporated by reference in its entirety.

TECHNICAL FIELD

This disclosure relates generally to wireless networks.

BACKGROUND

A wireless mesh network may have multiple entry/exit points, or portals, to a LAN. In some cases, a wireless mesh network may have multiple portals connecting to a single local area network (LAN) segment, or to several segments bridged together. Such a situation creates a networking problem. For example, the mesh network should appear as a single loop-free segment, to an 802.1D Spanning Tree Protocol (STP). If multiple portals connect back to the same LAN, and traffic is allowed to flow across them, a loop is created within the network. Traffic could leave the mesh network by one portal, cross the LAN, and reenter the mesh at the other portal. Traffic could also leave the LAN by one portal, cross the mesh network, and reenter the LAN at the other portal.

A common approach to a mesh network with multiple portals is to elect one of those portals, e.g., using some measure of bridge port priority, and to disable the others. This approach creates problems of its own. For example, if the single active portal loses its connection to the LAN, is powered down, or is blocked for any reason, the entire mesh loses its connection to the LAN until another portal is enabled. Also, using a single portal, in a configuration where multiple portals exist, creates an artificial bottleneck in traffic flow.

BRIEF DESCRIPTION OF THE DRAWINGS

The accompanying drawings, which are incorporated in and form a part of this specification, illustrate particular embodiments of the invention and, together with the description, serve to explain the principles of the invention.

DESCRIPTION OF EXAMPLE EMBODIMENTS

Reference will now be made in detail to several particular embodiments of the invention. While the invention will be described in conjunction with the alternative embodiment(s), it will be understood that they are not intended to limit the invention to these particular embodiments. On the contrary, the invention is intended to cover alternative, modifications, and equivalents, which may be included within the spirit and scope of the invention as defined by the appended claims.

Furthermore, in the following description of example embodiments of the present invention, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Portions of the description that follows are presented and discussed in terms of a method. Although steps and sequencing thereof are disclosed in a figure herein (e.g., FIG. 6) describing the operations of this method, such steps and sequencing are intended as an example. Embodiments of the present invention are well suited to performing various other steps or variations of the steps recited in the flowchart of the figure herein, and in a sequence other than that depicted and described herein.

Some portions of the descriptions which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing," "writing," "including," "testing," "using," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Computing devices typically include at least some form of computer readable media. Computer readable media can be any available media that can be accessed by a computing device. By way of example, and not limitation, computer readable medium may comprise computer storage media and communication media. Computer storage media includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by a computing device. Communication media typically embodies computer readable instructions, data structures, program modules, or other data in a modulated data signals such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

Figure 1:
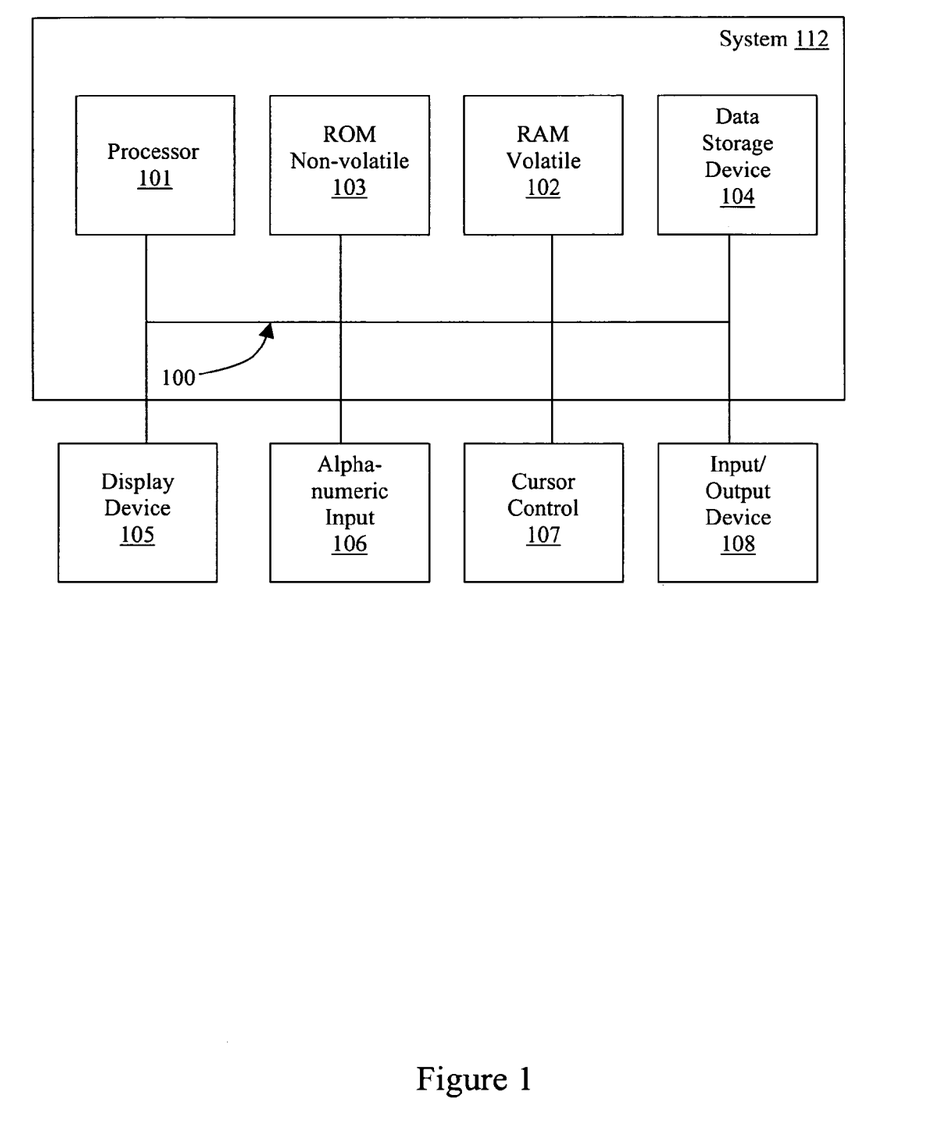
FIG. 1 illustrates an example computer system.

Referring first to FIG. 1, an illustration of example computer system 112 is shown. It is appreciated that computer system 112 described herein illustrates an example configuration of an operational platform upon which particular embodiments of the present invention can be implemented. Nevertheless, other computer systems with differing configurations can also be used in place of computer system 112 within the scope of the present invention. That is, computer system 112 can include elements other than those described in conjunction with FIG. 1.

Computer system 112 includes an address/data bus 100 for communicating information, a central processor 101 coupled with bus 100 for processing information and instructions; a volatile memory unit 102 (e.g., random access memory [RAM], static RAM, dynamic RAM, etc.) coupled with bus 100 for storing information and instructions for central processor 101; and a non-volatile memory unit 103 (e.g., read only memory [ROM], programmable ROM, flash memory, etc.) coupled with bus 100 for storing static information and instructions for processor 101. Computer system 112 may also contain an optional display device 105 coupled to bus 100 for displaying information to the computer user. Moreover, computer system 112 also includes a data storage device 104 (e.g., disk drive) for storing information and instructions.

Also included in computer system 112 is an optional alphanumeric input device 106. Device 106 can communicate information and command selections to central processor 101. Computer system 112 also includes an optional cursor control or directing device 107 coupled to bus 100 for communicating user input information and command selections to central processor 101. Computer system 112 also includes signal communication interface (input/output device) 108, which is also coupled to bus 100, and can be a serial port. Communication interface 108 may also include wireless communication mechanisms. Using communication interface 108, computer system 112 can be communicatively coupled to other computer systems over a communication network such as the Internet, intranet (e.g., a local area network), wireless network, or wireless mesh network.

Figure 2:
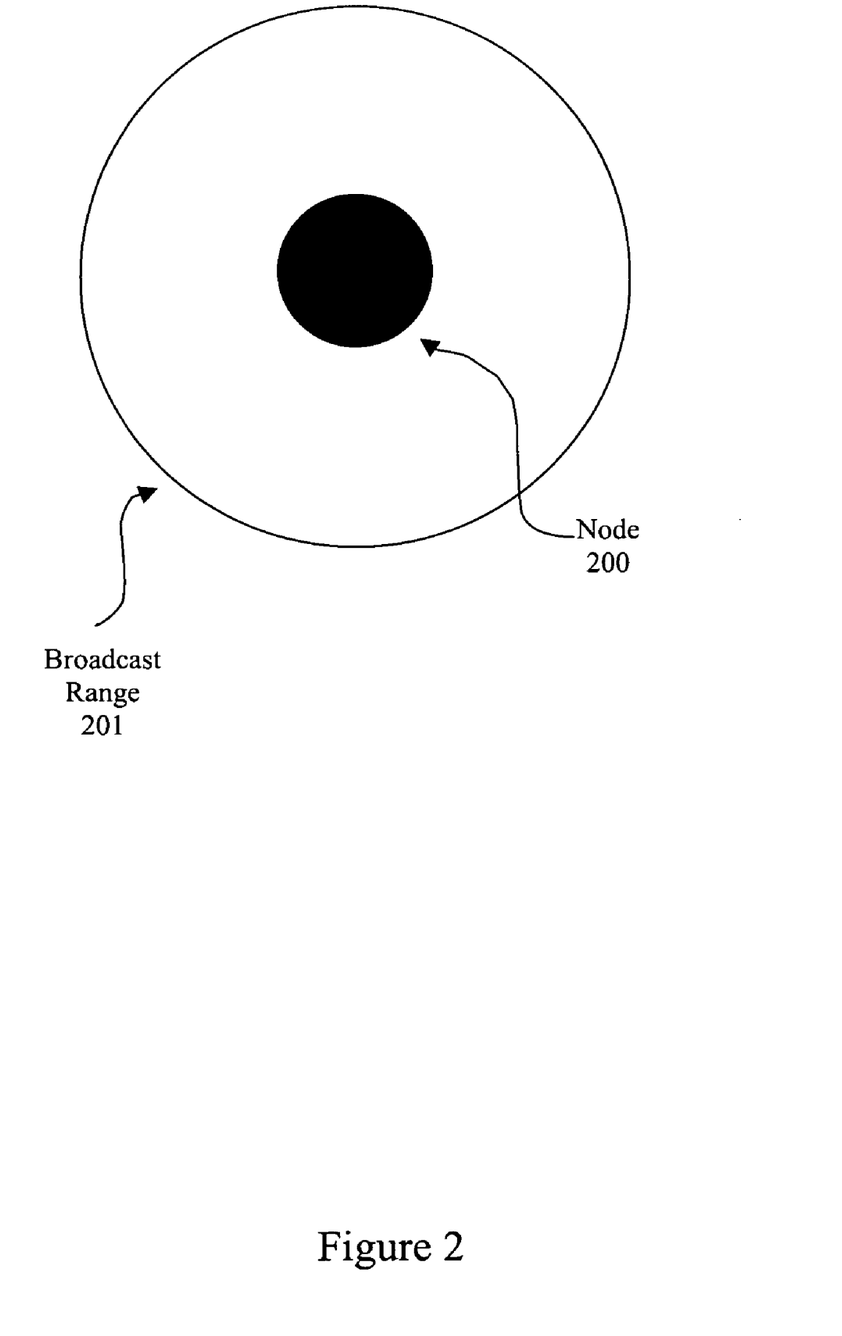
FIG. 2 illustrates an example wireless mesh network node.

With reference now to FIG. 2, an illustration of an example wireless network mesh node 200 is depicted, in accordance with one particular embodiment of the present invention. In particular embodiments, mesh node 200 is configured to send and receive data wirelessly, e.g., using a wireless networking standard, such as 802.11. In some particular embodiments, mesh node 200 is connected to other mesh nodes or other networks using a physical connection. In some particular embodiments, both approaches are utilized.

Mesh node 200, in particular embodiments, is intended to be utilized as part of a wireless mesh network, such as that described below, with reference to FIG. 3. In such embodiments, mesh node 200 can communicate with other mesh nodes or wireless devices, e.g. system 112, when those mesh nodes or wireless devices are within broadcast range of mesh node 200, as shown by circle 201.

In particular embodiments, mesh node 200 is configured to allow a wireless device to connect to it, and through it to a mesh network. Mesh node 200 receives data from the wireless device, or from another mesh node, and forwards it, either to the intended destination, or to another mesh node in the mesh network.

Figure 3:
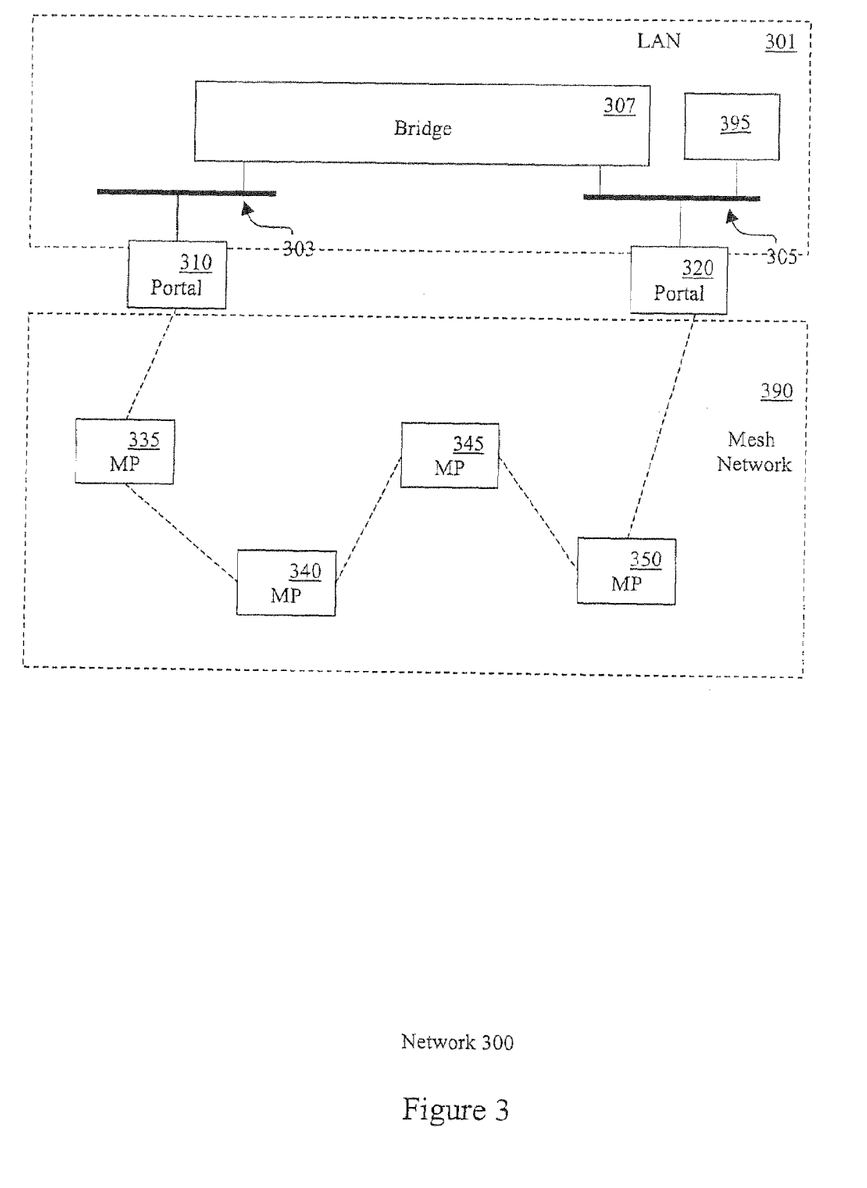
FIG. 3 illustrates an example network.

With reference now to FIG. 3, an illustration of an example network 300 is depicted, in accordance with one particular embodiment of the present invention. Network 300 shows a simplified wireless network connected to a bridged LAN through multiple portals. Specifically, mesh network 390 connects to bridged LAN 301 at portal 310, which connects to LAN segment 303, and also at portal 320, which connects to LAN segment 305. LAN 303 and LAN 305 are interconnected, or bridged, by bridge 307.

Mesh network 390 is also shown as including a number of mesh points, namely mesh points 335, 340, 345, and 350.

Particular embodiments of the present invention seek to address several issues. First, particular embodiments serve to make multiple mesh portals available. Second, particular embodiments allow for load balancing between multiple portals. Further, particular embodiments allow for efficient bridging between disconnected LAN segments.

When faced with a situation like network 300, two approaches were common in the prior art. In the absence of a topology tree, e.g., an IEEE 802.11s Hybrid Wireless Mesh Protocol (HWMP) topology tree, all unicast frames directed at the mesh network would be flooded to all portals. Additionally, all broadcast or multicast frames are also flooded to all active portals. This results in duplicative transmissions throughout the mesh network, and the consumption of valuable wireless bandwidth. If a topology tree is present, the prior art approach involves blocking all but one portal into the mesh network. While this helps to contain flooding issues, in that only the one root, or primary, portal will forward unicast or broadcast frames throughout the mesh network, it introduces a different problem. Specifically, even if it is possible to reach a particular destination outside the mesh through more than one portal, this approach limits connections to passing through the root portal. Even if connecting to the destination through one of the other portals would be faster, or would help to reduce the strain on the root portal, only the root portal path is available and used.

Particular embodiments of the present invention serve to resolve both issues present in the prior art. In some particular embodiments, a root portal is used to reduce flooding a wireless network, while secondary portals remain available for more efficient communication paths and for load balancing.

For example, if a broadcast frame is sent out across LAN 301, it will be received at portal 310 and portal 320. In one particular embodiment, portal 310 is selected as the root portal for mesh network 390. In this embodiment, only the root portal will broadcast the received broadcast frame throughout mesh network 390.

Additionally, if mesh point 345, within mesh network 390, needs to communicate with destination 395, attached to LAN segment 305, the most direct path between the source and the intended destination may pass through portal 320. Rather than having to route traffic through the root portal, portal 310, the more direct and/or faster path through portal 320 can be utilized. These particular embodiments are described in greater detail, below.

Figure 4:
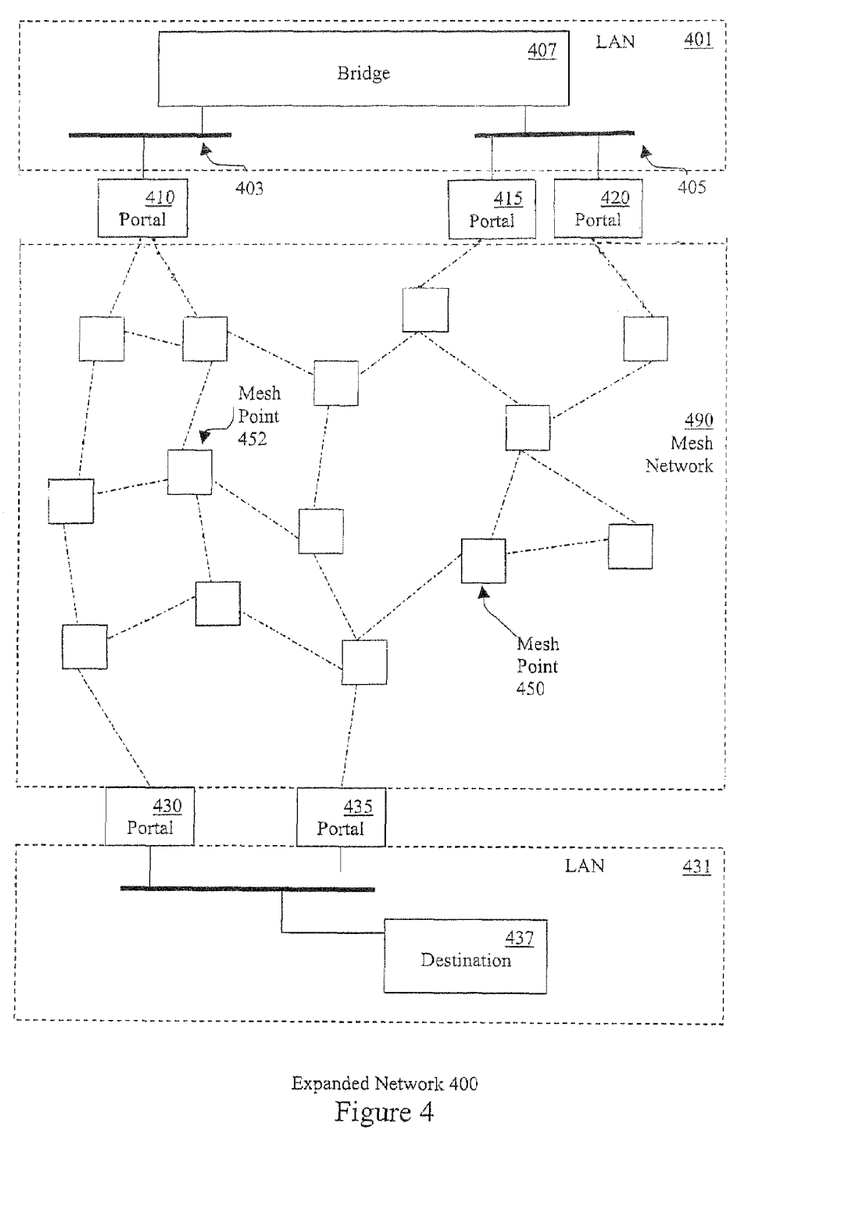
FIG. 4 illustrates an example expanded network.

With reference now to FIG. 4, an illustration of an example expanded network 400 is depicted, in accordance with one particular embodiment of the present invention. Expanded network 400 shows LAN 401 and LAN 431 interconnected by mesh network 490. LAN 401 is made up of LAN segment 403 and LAN segment 405, interconnected by bridge 407. LAN 401 is connected to mesh network 490 by portal 410, connected to LAN segment 403, and portals 415 and 420, both connected to LAN segment 405. LAN 431 is connected to mesh network 490 by two portals, portal 430 and portal 435. Mesh network 490 is shown as being made up of a collection of interconnected mesh points, such as mesh points 450 and 452.

It is understood that while expanded network 400 is shown as including specific, enumerated components, embodiments of the present invention are well suited for use across a wide variety of applications and technologies. Moreover, while expanded network 400 is shown as including a single mesh network and two disjoint LANs, it is understood that additional networks, both wired and wireless, could be incorporated into the expanded network.

In some particular embodiments, portals can take on a variety of roles. In one such embodiment, a single portal for the entire mesh network takes on the role of the primary, or root, portal. Many possible approaches for selecting a root portal are available; in different embodiments, different approaches are used. In one particular embodiment, for example, static role assignment is used, such that a specific portal is externally designated as the root portal. In another particular embodiment, for example, a dynamic role allocation approaches used, e.g., where the portal with the most preferred operating costs takes on the role of root portal.

After a root portal has been selected, the remaining portals attached to the mesh network take on different roles. These remaining portals fall within two broad categories. Some portals are connected to the same LAN as the root portal, or to LANs which are connected to or bridged to the same LAN as the root portal, outside of the mesh network. These portals take on the role of backup-to-root; they can reach the same destinations as the root portal, which allows them to be used for load balancing across the LAN, and to reach destinations on the LAN more efficiently.

The remaining portals are connected to disconnected LANs or LAN segments. If multiple portals reach the same disconnected LAN, one of those portals is assigned the role of disconnected portal; any other portals that reached that same LAN serve as backup-to-disconnected portals.

A number of methods and approaches are available for organizing a mesh network, such as mesh network 490. Different embodiments of the present invention are well suited for use with any method of organizing a mesh network. For example, one particular embodiment is well suited for use with the HWMP path selection protocol.

Further, particular embodiments of the present invention are well suited for use with many different types of LANs. For example, in one particular, a LAN attached to the mesh network uses the 802.1 Spanning Tree Protocol (STP); in such an embodiment, bridge protocol data units (BPDUs) are exchanged across the LAN, and received at the portals to the mesh network. These BPDUs are used to help identify portals, and further to help in assigning roles to the detected portals. In some particular embodiments, BPDUs are filtered by "source address filtering" on all connected portals, in order to keep all portals available for forwarding mesh traffic. In one such particular embodiment, this also serves to prevent selecting a mesh portal as the designated bridge for a LAN segment while creating a mesh bridged LAN between disconnected portals. In other embodiments, other methods are used.

In some particular embodiments, unicast data frames originating from outside the mesh are directed to the root portal. The root portal attempts to find the destination within the mesh; if it does not, it will forward the unicast frame to any disconnected portals. With reference to FIG. 4, for example, if portal 410 is the root portal and portal 430 is a disconnected portal, then portals 415 and 420 are backup-to-root portals, and portal 435 is a backup-to-disconnected portal. A unicast data frame received at portal 415 would be tunneled across mesh network 490 to portal 410. If portal 410 could not identify the destination as being within mesh network 490, it would forward the unicast data frame to any disconnected portals, namely portal 430.

In some particular embodiments, multicast or broadcast data frames originating from outside the mesh are forwarded to the root portal, if they are received at a disconnected portal. Multicast data frames received at a backup-to-root portal, in these embodiments, can be assumed to have been received at the root portal as well; as such, it is not necessary to forward those frames. Similar logic applies to backup-to-disconnected portals. In some particular embodiments, and including several in which the HWMP path selection protocol is used, the root portal may optionally share the registered addresses within the mesh with disconnected portals; this may aid in more efficient forwarding the frames originating from or destined to a disconnected LAN segment.

In some particular embodiments, when a mesh point sends a frame to an unknown destination via the root portal, and a reply comes back from behind a disconnected portal, the disconnected portal forwards the frame to the root portal, as the mesh point is unknown to the disconnected portal. A shorter route can be established back to the source mesh point for future forwarding between the disconnected portal and that mesh point. In some such particular embodiments, where a backup-to-disconnected portal is available as well, a shorter route may pass through the backup-to-disconnected portal instead. For example, if mesh point 450 sends a frame to destination 437, which is on LAN 431, the frame is first routed to the root portal, portal 410. Portal 410, in one particular embodiment, will send the frame out to LAN 401, and also forward it to disconnected portal 430. When disconnected portal 430 passes the frame to destination 437, and receives a response to return to mesh point 450, the response will be routed to portal 410, and then back to mesh point 450. Now that the location of destination 437 is known, a shorter route, passing through backup-to-disconnected portal 435 can be established.

In some particular embodiments, portal announcements are made across the mesh network. In such embodiments, portal announcements inform mesh points of non-root portals and their roles. In some particular embodiments, a mesh point can direct traffic to a backup-to-root portal, rather than the root portal. This can help to effectuate load-balancing between the root portal and any backup-to-root portals. In some particular embodiments, this is accomplished by using a mesh encapsulation technique, where the encapsulated frame can be directed to the backup-to-root portal, instead of the root portal. For example, mesh point 450 may direct packets to backup-to-root portal 415, rather than root portal 410. In several such particular embodiments, such direction is performed on a per-source basis, to effectuate the backward learning of STP running on wired LAN.

In some particular embodiments, portals connected to the mesh network share, age, and expire addresses learned from their attached LAN segments. This aids in supporting different types of nodes mobility between the mesh and other LAN segments, particularly in larger LANs using portal update messages.

Figure 5:
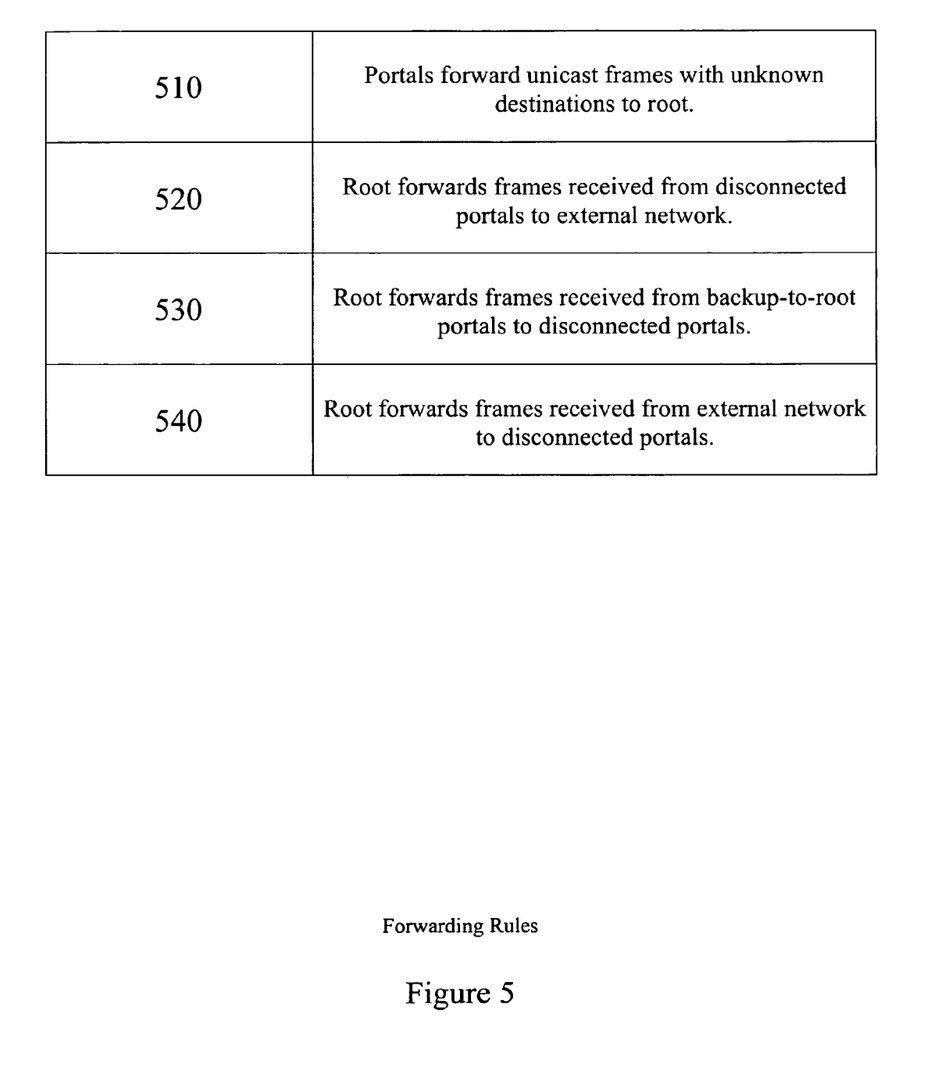
FIG. 5 illustrates example forwarding rules.

With reference now to FIG. 5, example forwarding rules for traffic between portals are listed, in accordance with one particular embodiment.

In this particular embodiment, as illustrated by rule 510, portals tunnel unicast frames with unknown destinations to the root portal.

In this embodiment, as illustrated by rule 520, frames received from disconnected portals are passed to the external network by the root portal.

In this embodiment, as illustrated by rule 530, the root portal forwards frames received from backup-to-root portals to disconnected portals.

In this embodiment, as illustrated by rule 540, frames received by the root portal from the external network are forwarded to disconnected portals.

The combination of these rules, in some particular embodiments, helps ensure certain desirable aspects. First, no looping can occur between the larger LAN network. Rule 510 ensures that unicast frames entering the mesh network from the external network via a backup-to-root portal are passed to the root portal. Rule 530 then ensures that the unicast frames are not returned to the external network, but are forwarded to any disconnected portals connected to the mesh network. Rule 540 prevents unicast frames received from the external network from being passed to the backup-to-root portals, which prevents them from looping back into the external network.

Additionally, the attached LAN or LANs are prevented from using a mesh network as a bridged link, if there is a LAN path that could be used. Rules 510 and 530 combine to prevent frames from entering the mesh at a backup-to-root portal and exiting at the root portal. Rule 540 prevents frames from entering at the root portal and exiting at a backup-to-root portal. Essentially, in some particular embodiments, data cannot enter from and exit to the same LAN. However, nothing in these rules prevents the mesh from serving as a bridge between two disconnected LANs.

In some particular embodiments, because the default forwarding scheme between a mesh node and a destination is via the root portal, the data path may be suboptimal. In several such embodiments, when a reply to a frame comes from a destination, the reply is forwarded to the root portal. The root portal may then establish a better route back to the source mesh node, e.g., using the path selection protocol in use in the mesh network. When a better route is established between the destination and the mesh node, then this path is used for all frame forwarding from the mesh node to the destination, and for all frame forwarding from the destination to the mesh node. In some particular embodiments, the mesh point may also be able to use a backup portal to reach the destination, e.g., for load-balancing purposes.

For example, with reference to FIG. 4, if mesh node 450 sends a frame for destination 437, the frame is first routed to root portal 410. Root portal 410 sends the frame to disconnected portal 430, which forwards the frame to destination 437. When a reply comes back from destination 437, it enters mesh network 490 via disconnected portal 430. The reply is sent back to root portal 410. Root portal 410 identifies a more optimal route for data to pass from node 450 to disconnected portal 430, and hence to destination 437. In some particular embodiments, a path can be established between node 450 and backup-to-disconnected portal 435 instead.

Load balancing allows data traffic to be evenly distributed in a network over multiple paths. Load-balancing can occur, in some particular embodiments, based on source, destination, or a combination of source and destination information. Further, in some particular embodiments, load-balancing can operate on a per destination, per frame basis. In other embodiments, per frame load-balancing is not performed; per frame load-balancing may cause too many changes in bridge tables, resulting in an unacceptable overhead cost.

Load-balancing, applied to traffic flowing between a mesh and an external network, in some particular embodiments serves to reduce the possibility of overloading the root portal. By default, in some particular embodiments, traffic entering or leaving the mesh passes through the root portal. If one or more backup-to-root portals are available, every backup-to-root portal can reach the same destinations as the root portal, e.g., the same destination on the external network.

A mesh point, using the portal roles, can elect to set up a better route between the mesh point and destination, e.g., using the path selection protocol and the backup-to-root portals. The mesh point can load balance traffic on a per destination basis, such that traffic intended for one destination may be passed to the root portal, while traffic intended for another destination is passed to a backup-to-root portal. Further, in some particular embodiments, a mesh point may also choose to send unknown frames to a backup-to-root portal, rather than to the root portal, if the mesh point already has excessive numbers of frames to send to the root portal.

In some particular embodiments, mesh encapsulation techniques are used to efficiently enable forwarding frames between two mesh nodes, as described above.

The above-described technique for load-balancing the root portal is equally applicable to a disconnected portal with available backup-to-disconnected portals.

In some particular embodiments, the technique described above for load-balancing can be utilized to increase available bandwidth between the mesh network and an attached LAN. In some such particular embodiments, the connection between a portal and a mesh network has a fixed amount of available bandwidth. If multiple portals are available, with multiple separate connections to the mesh network, it is possible to spread the load across these multiple connections, effectively increasing the bandwidth between the external network and the mesh.

In some particular embodiments, where a disconnected portal and one or more backup-to-disconnected portals are also available, this approach allows for a bridge to exist between two disjoint networks across the mesh network, with increased available bandwidth.

For example, with reference to FIG. 4, the bandwidth available to root portal 410 is limited. As such, data transfer from LAN 401 to mesh network 490 through root portal 410 is limited to the bandwidth available via that connection. However, backup-to-root portals 415 and 420 also connect LAN 401 to mesh network 490. If these connections are also utilized to transfer data between LAN 401 and mesh network 490, then the available bandwidth is increased.

If data is to be passed from LAN 401 to LAN 431 via mesh network 490, then the available bandwidth for such a transmission would be increased, if both disconnected portal 430 and backup-to-disconnected portal 435 are available. In one particular embodiment, data could enter from LAN 401 through root portal 410 and be passed through mesh network 490 to disconnected portal 430. Meanwhile, data could enter through backup-to-root portal 415 and be passed to backupto-disconnected portal 435. In the depicted embodiment, the paths described through mesh network 490 happen to avoid overlap. In other particular embodiments, overlap of these routes may occur. In other particular embodiments, routes may be selected to avoid overlap.

Figure 6:
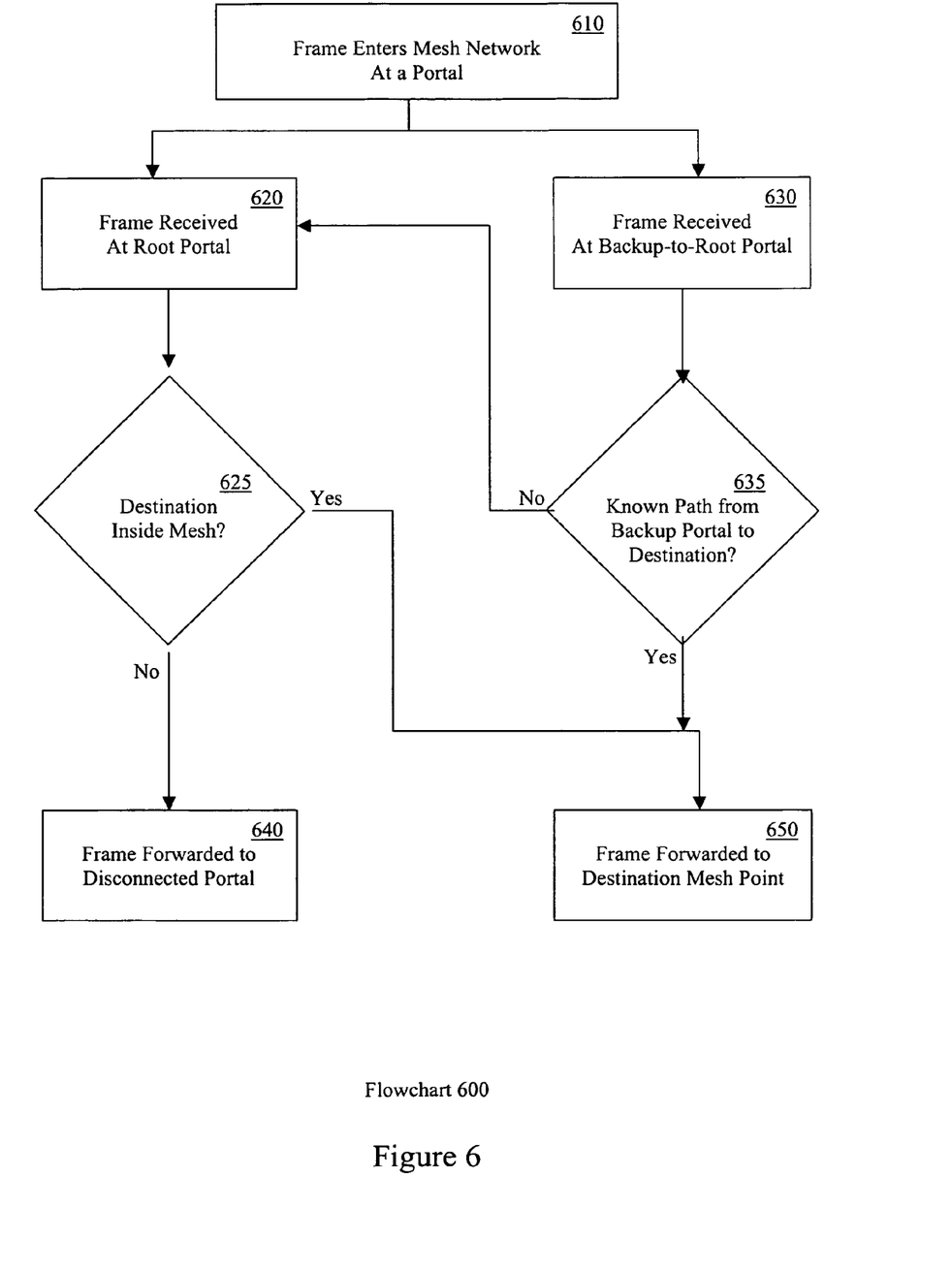
FIG. 6 illustrates an example method of handling downstream traffic.

With reference now to FIG. 6, a flowchart 600 of an example method of handling downstream traffic is depicted, in accordance with one particular embodiment. Although specific steps are disclosed in flowchart 600, such steps are intended as an example. That is, particular embodiments of the present invention are well suited to performing various other (additional) steps or variations of the steps recited in flowchart 600. It is appreciated that the steps in flowchart 600 may be performed in an order different than presented, and that not all of the steps in flowchart 600 may be performed.

For purposes of the following discussion, "downstream" traffic is viewed as network traffic or activity that originates outside of the mesh network, and enters the mesh through the external LAN attached to the root portal. Downstream traffic flows into, or through, the mesh network from the root portal. Similarly, "upstream" traffic is traffic which originates from within the mesh network, or enters the match through a disconnected or backup-to-disconnected portal. Upstream traffic then flows up the mesh network towards the root portal.

With reference now to step 610, a frame or data packet enters a mesh network through a portal attached to a LAN. If the frame or data packet enters the network through the root or primary portal, the method proceeds to step 620. If the frame or data packet enters the network through a backup-to-root portal, the method proceeds step 630.

With reference now to step 620, the frame or data packet is received at the root portal.

With reference now to step 625, the frame or data packet is examined to determine if the intended destination lies within the mesh network. If the destination is not within the mesh, the method proceeds to step 640. If the destination is within the mesh, the method proceeds to step 650.

With reference now to step 630, the frame or data packet is received at a backup-to-root portal.

With reference now to step 635, the frame or data packet is examined at the backup-to-root portal, to determine whether a path is known between the backup-to-root portal and the intended destination of the frame or packet. If such a path is known, the method proceeds to step 650. If a path is not known, the frame or packet is forwarded to the root portal, and the method reverts to step 620.

With reference now to step 640, the root portal forwards the frame or data packet to one or more disconnected portals attached to the mesh network.

With reference now to step 650, the frame or data packet is routed to the mesh destination inside the mesh network.

In some particular embodiments, the method described in flowchart 600 can be adapted for traffic received at disconnected or backup-to-disconnected portals. In some such embodiments, all disconnected portals are treated similarly to a backup-to-root portal. If a known path to a destination within the mesh network is available, a frame received at a disconnected portal can be routed along it. Otherwise, frames received at a disconnected portal are routed to the root portal. If the destination is outside of the mesh network, the root portal will forward the frame or packet to any other disconnected portals, as well as to the external LAN attached to the root portal.

In some particular embodiments, the method described by flowchart 600 is used to "bridge" to disconnected LANs together across the mesh network. Data received by the root portal from the external LAN, with a destination outside of the mesh network, will be routed through the mesh to a disconnected portal, and hence to a disconnected LAN attached to the disconnected portal. Similarly, data received at the disconnected portal, a destination outside of the mesh network, will be routed through the mesh to the root portal, and hence to the external LAN.

Figure 7:
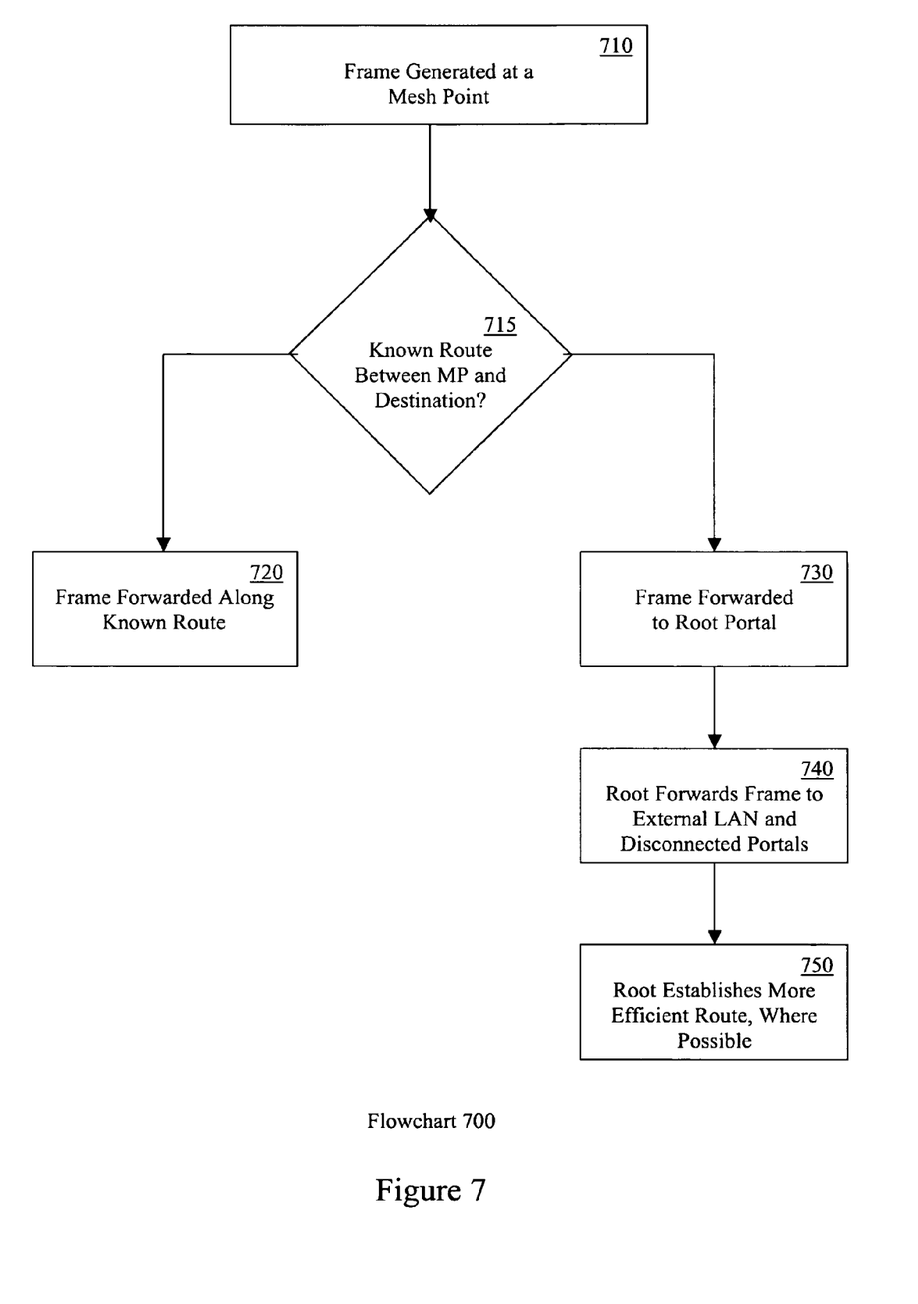
FIG. 7 illustrates an example method for handling upstream traffic.

With reference now to FIG. 7, a flowchart 700 of an example method of handling upstream traffic is depicted, in accordance with one particular embodiment of the present invention. Although specific steps are disclosed in flowchart 700, such steps are intended as an example. That is, particular embodiments of the present invention are well suited to performing various other (additional) steps or variations of the steps recited in flowchart 700. It is appreciated that the steps in flowchart 700 may be performed in an order different than presented, and that not all of the steps in flowchart 700 may be performed.

With reference to step 710, a frame is generated at a mesh point. In some particular embodiments, the frame has a destination that lies outside of the mesh network.

With reference now to step 715, the generating mesh point determines whether a route is known between the mesh point and the destination. If a route is known, the method progresses to step 720. If no such route is known, the method progresses to step 730.

With reference now to step 720, the frame is forwarded through the mesh network, along the known route. In some particular embodiments, this route may pass through a disconnected portal. In other particular embodiments, this route may pass through a backup-to-root portal, or through a backup-to-disconnected portal.

With reference now to step 730, the frame is forwarded to the root portal.

With reference to step 740, the root portal forwards the frame to the attached external LAN. In some particular embodiments, the root portal also forwards the frame to one or more disconnected portals attached to the mesh network, for forwarding to disconnected LANs reachable through these disconnected portals.

With reference to step 750, if a reply is received at a disconnected portal, backup-to-root portal, or backup-to-disconnected portal, the root portal may attempt to establish an alternative, more efficient route between the mesh point and the destination.

Particular embodiments of the present invention are thus described. While the present invention has been described in particular embodiments, it should be appreciated that the present invention should not be construed as limited by such particular embodiments, but rather construed according to the following claims.

What is claimed is:

1. A system comprising:
    a first portal, communicatively coupled to a wireless mesh network and to an adjacent local area network (LAN), for providing a path of communication between said wireless mesh network and said LAN;
    a second portal, communicatively coupled to said wireless mesh network and to said adjacent LAN, for providing a further path of communication between said wireless mesh network and said adjacent LAN;
    a third portal, communicatively coupled to said wireless mesh network and to a disconnected LAN, for providing a path of communication between said wireless mesh network and said disconnected LAN; and
    a plurality of mesh points, communicatively coupled to said wireless mesh network, for providing an intermesh path between said first portal, said second portal, and said third portal, wherein said second portal is configured to forward a data frame with an unknown destination to said first portal, and wherein said first portal is configured to forward said data frame to said third portal when said unknown destination is not within said wireless mesh network.

2. The system of claim 1, wherein said third portal is configured to forward a second data frame with an unknown destination from said disconnected LAN to said first portal.

3. The system of claim 2, wherein said first portal is configured to forward said second data frame from said disconnected LAN to said adjacent LAN.

4. The system of claim 1, wherein said wireless mesh network is configured to provide a bridge between said adjacent LAN and said disconnected LAN.

5. The system of claim 4, further comprising:
a fourth portal, communicatively coupled to said wireless mesh network and to said disconnected LAN, for providing a further path of communication between said wireless mesh network and said disconnected LAN, wherein said fourth portal is configured to forward data from said disconnected LAN to said adjacent LAN in a first data path, wherein said third portal is configured to forward data from said disconnected LAN to said adjacent LAN in a second data path, and wherein said first and second data paths are configured to simultaneously transmit data frames to increase a bandwidth across the wireless mesh network.

6. A computer-readable storage medium having a set of instructions stored therein, which when executed by a processing device causes the processing device to perform a method comprising:
configuring a first data path between a wireless mesh network and a local area network (LAN), wherein said first data path comprises a first portal connecting said wireless mesh network and said LAN;
determining whether a destination of a data packet is known by said first portal;
configuring a second data path between said wireless mesh network and said LAN, wherein said second data path comprises a root portal connecting said wireless mesh network and said LAN;
forwarding said data packet from said first portal to said root portal;
determining whether a destination of said data packet is within said wireless mesh network;
if said destination is not within said wireless mesh network, configuring a third data path, wherein said third data path is between said LAN and a disconnected LAN; and
forwarding said data packet to said disconnected LAN via said third data path.

7. The system of claim 1, wherein said unknown destination is unknown to said first and second portals, and wherein said unknown destination is known to said third portal.

8. A method comprising:
receiving a frame into a first portal connecting a wireless mesh network to a first local area network (LAN);
determining whether a path between said first portal and an intended destination of said frame is known;
forwarding said frame to a root portal connecting said wireless mesh network to said first LAN;
determining whether said intended destination is within said first LAN; and
forwarding said frame to a second portal connecting said wireless mesh network to a second LAN, wherein said first LAN is connected to said second LAN via said wireless mesh network.

9. A method comprising:
receiving a frame into a first portal connecting a wireless mesh network to a local area network (LAN);
determining whether a path between said first portal and an intended destination of said frame is known;
if said path is known, routing said frame through said wireless mesh network to said destination;
if said path is not known, forwarding said frame to a second portal connecting said wireless mesh network to said LAN;
determining at said second portal whether said destination is within said wireless mesh network;
if said destination is within said wireless mesh network, routing said frame through said wireless mesh network to said destination; and
if said destination is not within said wireless mesh network, forwarding said frame to a third portal, said third portal connecting said wireless mesh network to a disconnected LAN.

10. The method of claim 8, wherein said first LAN is an 802 LAN.

11. The method of claim 8, wherein said wireless mesh network is configured in accordance with the 802.11s standard.

12. The method of claim 8, wherein said root portal is configured to forward said frame to said second portal when said intended destination is not within said first LAN.

13. The method of claim 12, wherein said first portal is configured to forward said frame to said root portal when said path between said first portal and said intended destination is not known.

14. The method of claim 8, wherein said intended destination is within said second LAN.

15. The computer-readable storage medium of claim 6, further comprising:
configuring a fourth data path, wherein said fourth data path is between said LAN and said disconnected LAN, and wherein said third and fourth data paths are configured to simultaneously transmit data between said LAN and said disconnected LAN to increase a bandwidth of said wireless mesh network.

16. The computer-readable storage medium of claim 6, further comprising:
receiving a reply from said destination into said root portal; and
establishing an optimal communication route between said destination and an origin of said data packet, wherein said destination resides in said disconnected LAN, and wherein said origin resides in said LAN.

17. The computer-readable storage medium of claim 16, wherein said optimal communication route comprises said second data path.

18. The computer-readable storage medium of claim 6, wherein said third data path comprises a bridge across said wireless mesh network, and wherein said bridge connects said LAN to said disconnected LAN.

19. The computer-readable storage medium of claim 16, wherein said third path comprises a third portal connecting said disconnected LAN to said wireless mesh network; and wherein said method further comprises:
routing said reply from said third portal to said origin.

20. The system of claim 7, wherein said unknown destination is within said disconnected LAN.

* * * * *

UNITED STATES PATENT AND TRADEMARK OFFICE
CERTIFICATE OF CORRECTION

PATENT NO. : 7,660,318 B2
APPLICATION NO. : 11/518332
DATED : February 9, 2010
INVENTOR(S) : Rahman et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 443 days.

Signed and Sealed this

Twenty-eighth Day of December, 2010

David J. Kappos
*Director of the United States Patent and Trademark Office*